US008590726B1

(12) United States Patent
Mickelson et al.

(10) Patent No.: US 8,590,726 B1
(45) Date of Patent: Nov. 26, 2013

(54) DOLL ORGANIZER

(76) Inventors: Autumn M. Mickelson, Grove City, MN (US); James D. Mickelson, Grove City, MN (US)

( * ) Notice: Subject to any disclaimer, the term of this patent is extended or adjusted under 35 U.S.C. 154(b) by 18 days.

(21) Appl. No.: 13/315,649

(22) Filed: Dec. 9, 2011

(51) Int. Cl.
*B65D 25/06* (2006.01)
*B65D 25/28* (2006.01)

(52) U.S. Cl.
CPC ............ *B65D 25/2844* (2013.01); *B65D 25/06* (2013.01)
USPC ......... 220/533; 220/763; 220/23.83; 206/504

(58) Field of Classification Search
CPC ............ B65D 25/285; B65D 25/2844; B65D 25/2841; B65D 25/2838; B65D 25/2835; B65D 25/06; B65D 25/04
USPC .......... 220/533, 532, 529, 23.86, 23.83, 23.4, 220/23.2, 505, 4.26, 4.27, 761, 763, 762, 220/764; 206/504; 211/194, 59.4, 49.1; 190/109, 110, 107, 115; 16/409, 408
See application file for complete search history.

(56) References Cited

U.S. PATENT DOCUMENTS

| | | | | |
|---|---|---|---|---|
| 630,886 A * | 8/1899 | Held | ................ | 16/445 |
| 1,094,820 A * | 4/1914 | Sargent | ............ | 16/408 |
| 2,460,840 A * | 2/1949 | Mockabee | ............ | 16/110.1 |
| 3,656,650 A * | 4/1972 | Frater | ............ | 220/533 |
| 3,891,230 A * | 6/1975 | Mayer | ............ | 280/43.24 |
| 4,118,048 A * | 10/1978 | Spranger et al. | ............ | 280/47.35 |
| 4,298,127 A | 11/1981 | Upshaw et al. | | |
| 4,436,215 A * | 3/1984 | Kleinert et al. | ............ | 220/533 |
| 4,577,773 A * | 3/1986 | Bitel | ............ | 220/533 |
| D316,343 S | 4/1991 | Coon | | |
| 5,240,264 A * | 8/1993 | Williams | ............ | 280/40 |
| 5,699,925 A * | 12/1997 | Petruzzi | ............ | 220/4.27 |
| 5,934,466 A | 8/1999 | Loeffler | | |
| 5,967,533 A | 10/1999 | Alexander | | |
| 6,123,344 A | 9/2000 | Clegg | | |
| RE37,518 E * | 1/2002 | Hardigg et al. | ............ | 16/438 |
| 6,520,514 B2 | 2/2003 | Clegg | | |
| D506,086 S | 6/2005 | Cassell | | |
| 7,044,569 B1 | 5/2006 | Relyea et al. | | |
| D531,406 S | 11/2006 | Tate | | |
| 2004/0195793 A1* | 10/2004 | Sullivan et al. | ............ | 280/79.11 |
| 2006/0108368 A1* | 5/2006 | Dube et al. | ............ | 220/552 |
| 2008/0128428 A1* | 6/2008 | Beckerman | ............ | 220/532 |

* cited by examiner

*Primary Examiner* — Robert J Hicks
(74) *Attorney, Agent, or Firm* — Robert C. Montgomery; Montgomery Patent & Design

(57) ABSTRACT

A doll organizer to store particularly suited for carrying dolls or similar items along with associated accessories includes a plurality of removably stackable compartments which includes a pair of rolling wheels at a retractable handle. The various compartments are particularly adapted to organize and retain a variety of common doll toy accessories. Additionally, each compartment includes a plurality of removable dividers for organizing the dolls and accessories in a selectable, modular manner. The individual compartments can be removed during use for ease of access to the various toys.

10 Claims, 9 Drawing Sheets

DOLL ORGANIZER

RELATED APPLICATIONS

There are currently no applications co-pending with the present application.

FIELD OF THE INVENTION

The present invention relates generally to a portable compartment, and in particular, to a holder for retaining dolls and doll accessories.

BACKGROUND OF THE INVENTION

Keeping children's toys organized is an issue for many people. The dolls, doll clothes, shoes, hair items, and the like become a lot to retain. Various ways to store these items are known. They include small opaque and immobile containers.

A common problem with all these systems is the lack of organization. Another problem area is the ability for transporting to desired locations. Furthermore with all of these systems access to desired items is difficult.

Various attempts have been made to provide an organizer for dolls. Examples of these attempts can be seen by reference to several U.S. patents. U.S. Pat. No. 4,298,127, issued in the name of Upshaw et al., describes a stackable basket assembly.

U.S. Pat. No. 5,967,533, issued in the name of Alexander, describes a stackable storage bins which include a wheeled base.

U.S. Pat. No. 7,044,569, issued in the name of Relyea et al., describes a modular drawer system with interchangeable components.

Additionally, ornamental designs for a doll caddy exist, particularly U.S. Pat. No. D 531,406. However, none of these designs are similar to the present invention.

While these systems fulfill their respective, particular objectives, each of these references suffer from one (1) or more disadvantages. Many such systems do not offer adequate organization. Others are limited and do not provide means of transporting.

SUMMARY OF THE INVENTION

The inventor has recognized the aforementioned inherent problems and lack in the art and observed that there is a need for an organizer for dolls which offers adequate organization and the ease of transporting the system.

Accordingly, it is an object of the present embodiments of the invention to solve at least one of these problems. The inventor has addressed this need by developing an organizer for dolls which provides adequate organization and the ease of transporting the system.

To achieve the above objectives, it is an object of the present invention to provide a multi-sectional container for organizing, storing, and transporting dolls and doll accessories.

Another object of the present invention is to provide a middle compartment, a lower compartment, and an upper compartment which are utilized to organize, store, and transport multiple dolls and doll accessories.

Yet still another object of the present invention is to provide an interlocking latching system between the middle, lower, and upper compartments.

Yet still another object of the present invention is to provide each compartment with dividers.

Yet still another object of the present invention is to provide a pivoting handle upon a rear surface of the middle compartment.

Yet still another object of the present invention is to provide wheels and stabilizing fingers upon the lower compartment.

Yet still another object of the present invention is to provide a hinged lid upon the upper compartment.

Yet still another object of the present invention is to provide an alternate telescoping handle assembly upon the rear surface of the middle compartment.

Yet still another object of the present invention is to provide a method of utilizing the device that provides a unique means of motioning the handle, motioning the systems via the wheels, accessing compartments for storage via unlatching and latching latches upon desired compartments, organizing dolls and accessories within the compartments and using the divides to create spaces, and organizing the dolls and accessories.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

DESCRIPTIVE KEY

Figure 1:
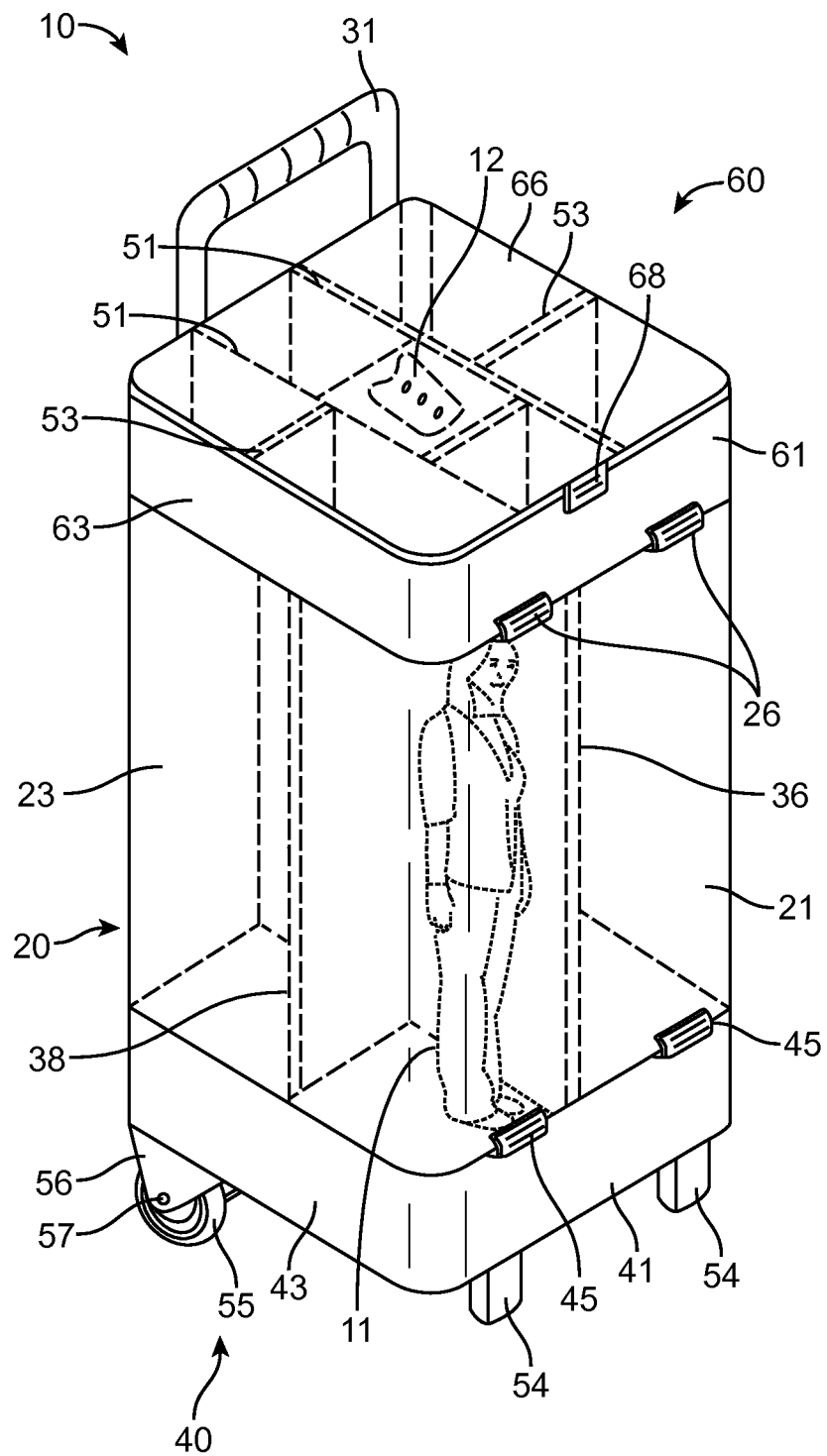
FIG. 1 is a front perspective view of a doll organizer 10, according to a preferred embodiment of the present invention.

10 doll organizer
11 doll 12 doll accessory
20 middle compartment
21 middle compartment front panel
22 middle compartment rear panel
23 middle compartment side panel
24 middle compartment interior portion
25 middle compartment upper edge
26 middle compartment front latch
27 middle compartment rear latch
28 middle compartment front protrusion
29 middle compartment rear protrusion
30 middle compartment track
31 handle
32 handle capturing member
33 clamp
34 middle compartment bottom panel
35 middle compartment bottom panel groove
36 middle compartment first divider
37 middle compartment first divider groove
38 middle compartment second divider
40 lower compartment
41 lower compartment front panel
42 lower compartment rear panel
43 lower compartment side panel
44 lower compartment bottom panel
45 lower compartment front latch
46 lower compartment rear latch
47 lower compartment interior portion
48 lower compartment track
49 lower compartment bottom panel groove
50 lower compartment upper edge
51 lower and upper compartment first divider
52 lower and upper compartment first divider groove
53 lower and upper compartment second divider
54 stabilizing finger
55 wheel
56 wheel fork
57 wheel axle
60 upper compartment
61 upper compartment front panel
62 upper compartment rear panel
63 upper compartment side panel
64 upper compartment bottom panel
65 upper compartment upper edge
66 lid
67 lid hinge
68 lid latch
69 lid protrusion
70 upper compartment interior portion
71 upper compartment track
72 upper compartment bottom panel groove
73 upper compartment front protrusion
74 upper compartment rear protrusion
80 alternate handle assembly
81 alternate handle casing
82 alternate handle grasping member
83 sliding member
84 alternate handle track

DETAILED DESCRIPTION OF THE PREFERRED EMBODIMENT

Figure 8:
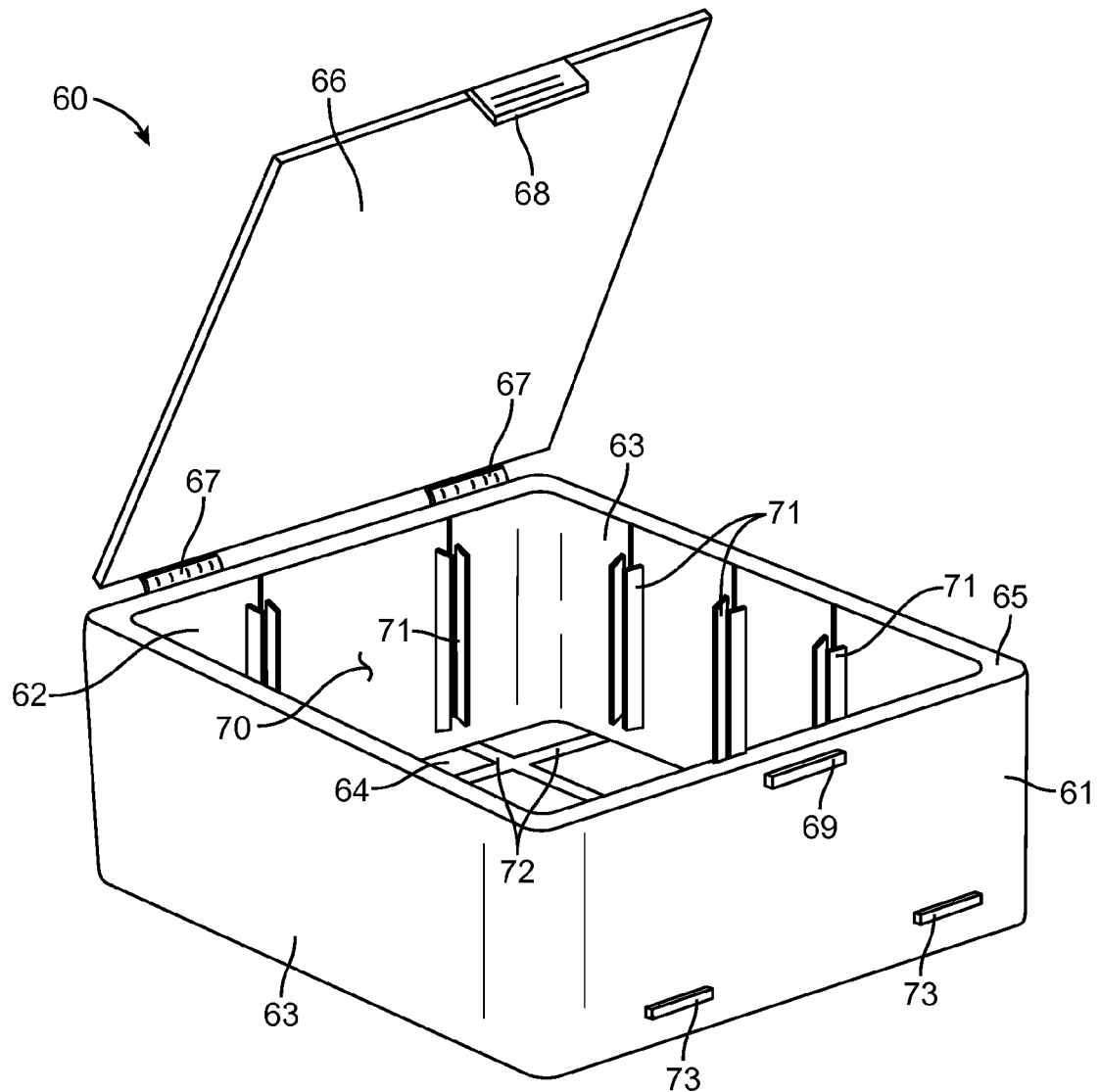
FIG. 8 is a front perspective view of an upper compartment 60, according to a preferred embodiment of the present invention.
Figure 9:
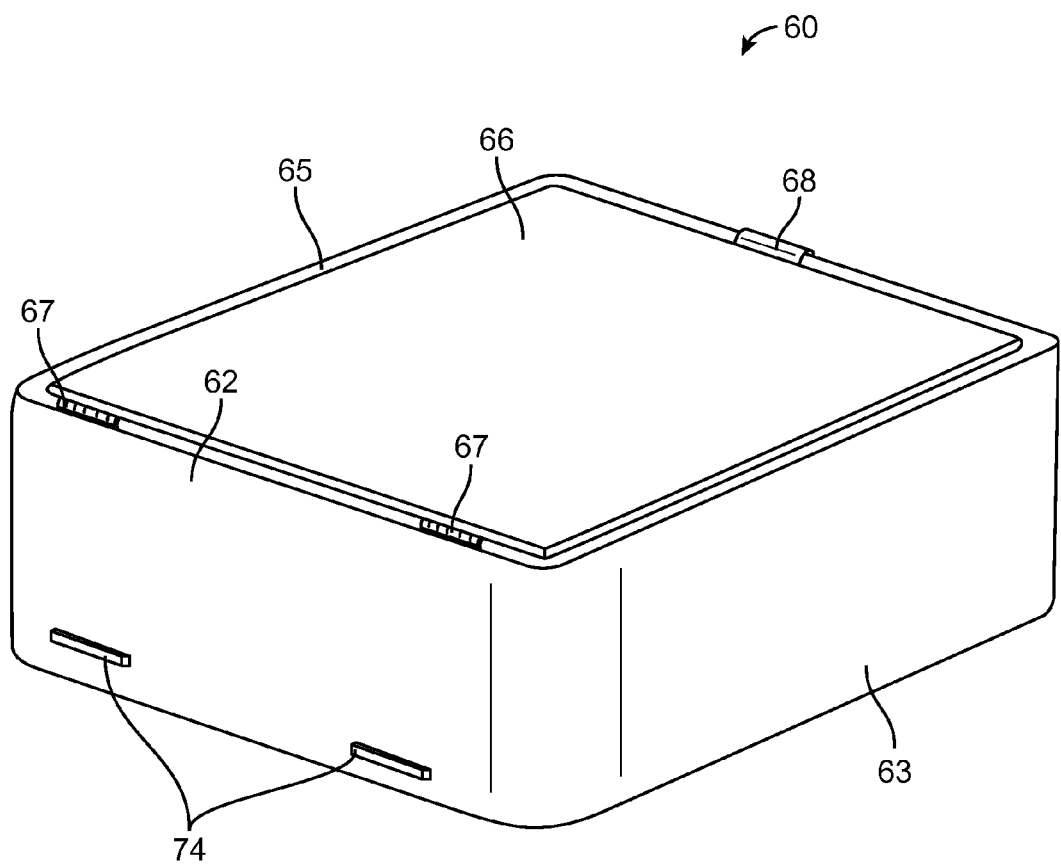
FIG. 9 is a rear perspective view of the upper compartment 60, according to a preferred embodiment of the present invention; and, FIG. 10 is a rear perspective view of the doll organizer 10 depicting an alternate handle assembly 80, according to a preferred embodiment of the present invention.
Figure 10:
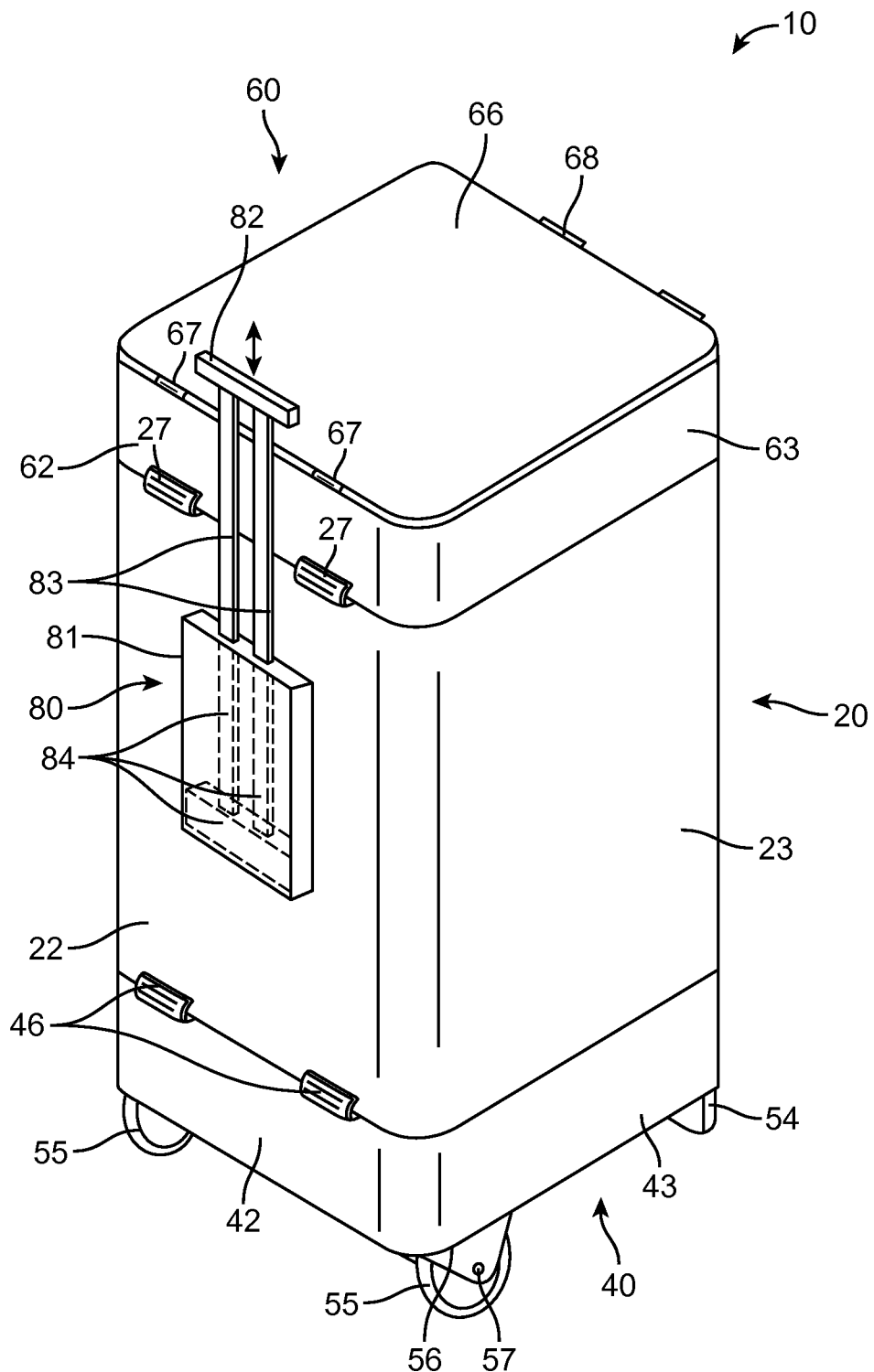

The best mode for carrying out the invention is presented in terms of its preferred embodiment, herein depicted within FIGS. 1 through 9 and alternately within FIG. 10. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a doll organizer (herein described as the "apparatus") 10, which provides a means for a multi-sectional container for organizing, storing, and transporting dolls 11 and doll accessories 12. It is understood that other, substantially different items may also be stored within the apparatus 10 and the current apparatus 10 is not merely limited to storage and transportation of dolls 11 and doll accessories 12.

Referring now to FIG. 1, a front perspective view of the apparatus 10, according to the preferred embodiment of the present invention, is disclosed. The apparatus 10 comprises a middle compartment 20, a lower compartment 40, and an upper compartment 60 which are utilized to organize, store, and transport multiple dolls 11 and doll accessories 12. The middle compartment 20 comprises a larger height than the lower compartment 40 or the upper compartment 60 to enable placement of dolls 11 within the middle compartment 20 and accessories 12 such as outfits, shoes, brushes, or the like within the lower compartment or the lower compartment 60. Each compartment 20, 40, 60 is preferably fabricated from a durable plastic which manufactured in various transparent colors.

Figure 2:
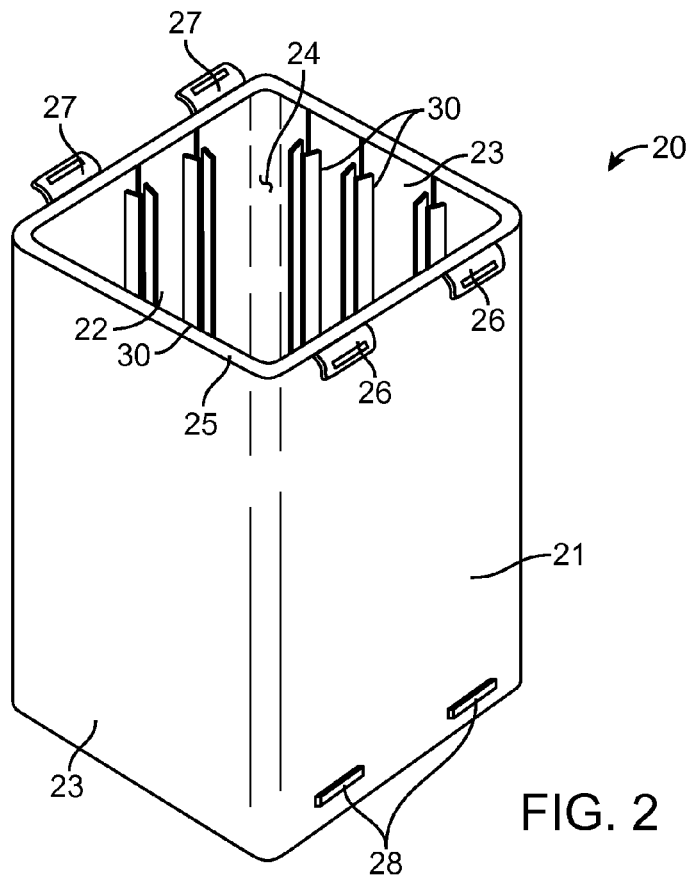
FIG. 2 is a front perspective view of a middle compartment 20, according to a preferred embodiment of the present invention.
Figure 3:
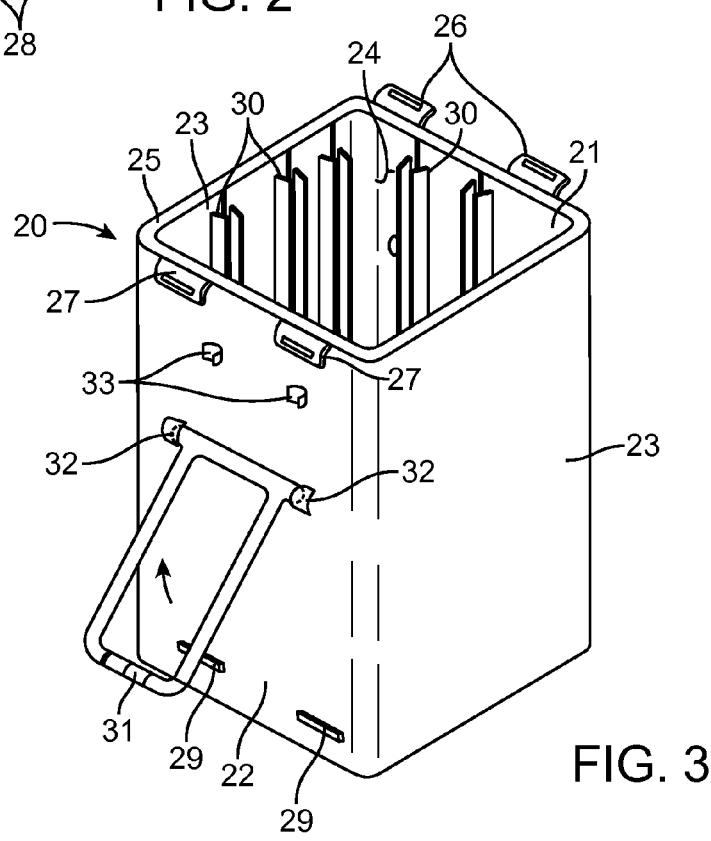
FIG. 3 is a rear perspective view of the middle compartment 20, according to a preferred embodiment of the present invention.
Figure 4:
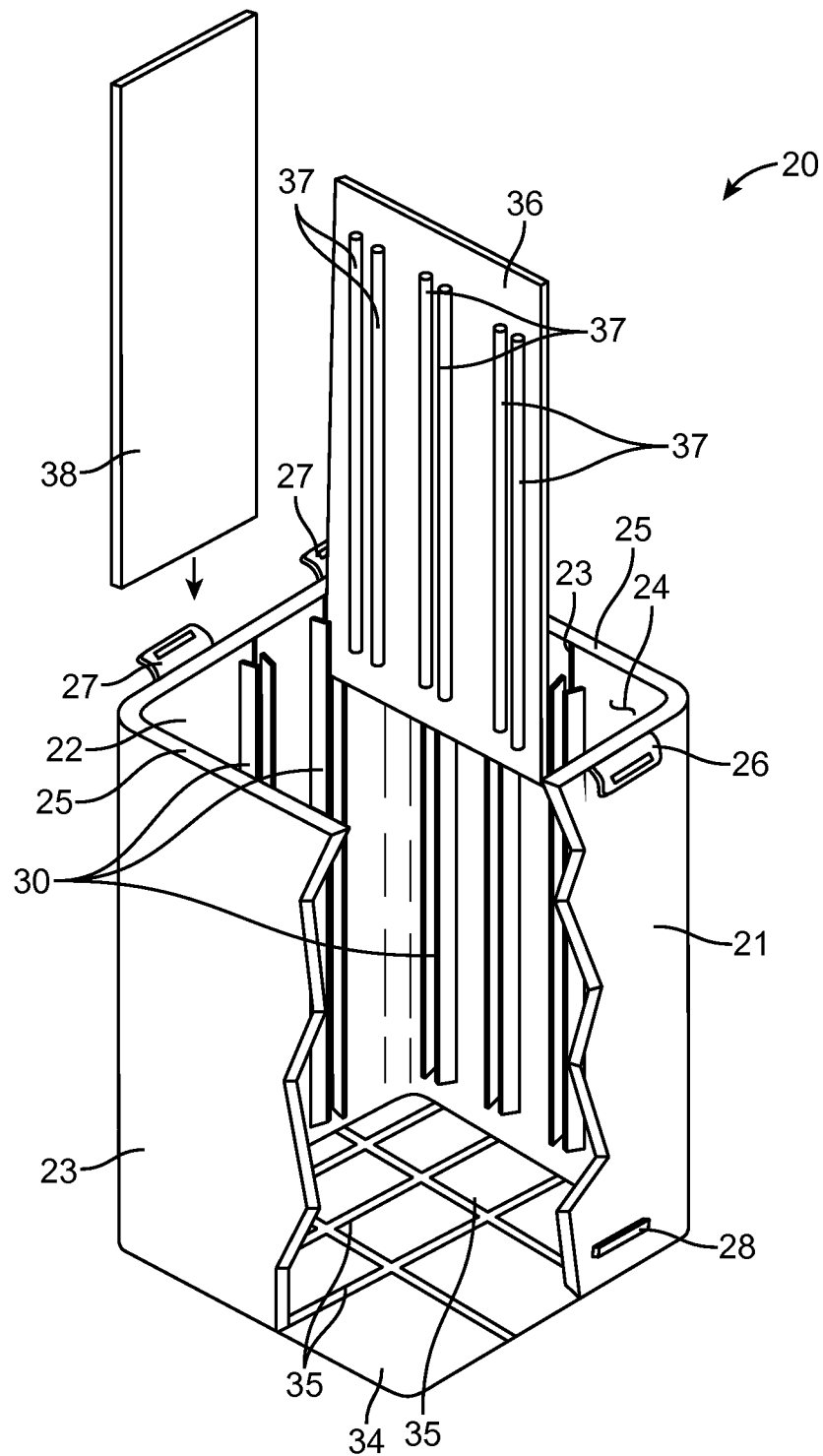
FIG. 4 is a cut-away front perspective view of the middle compartment 20 depicting insertion of a middle compartment first divider 36 and a middle compartment second divider 38, according to a preferred embodiment of the present invention.
Figure 5:
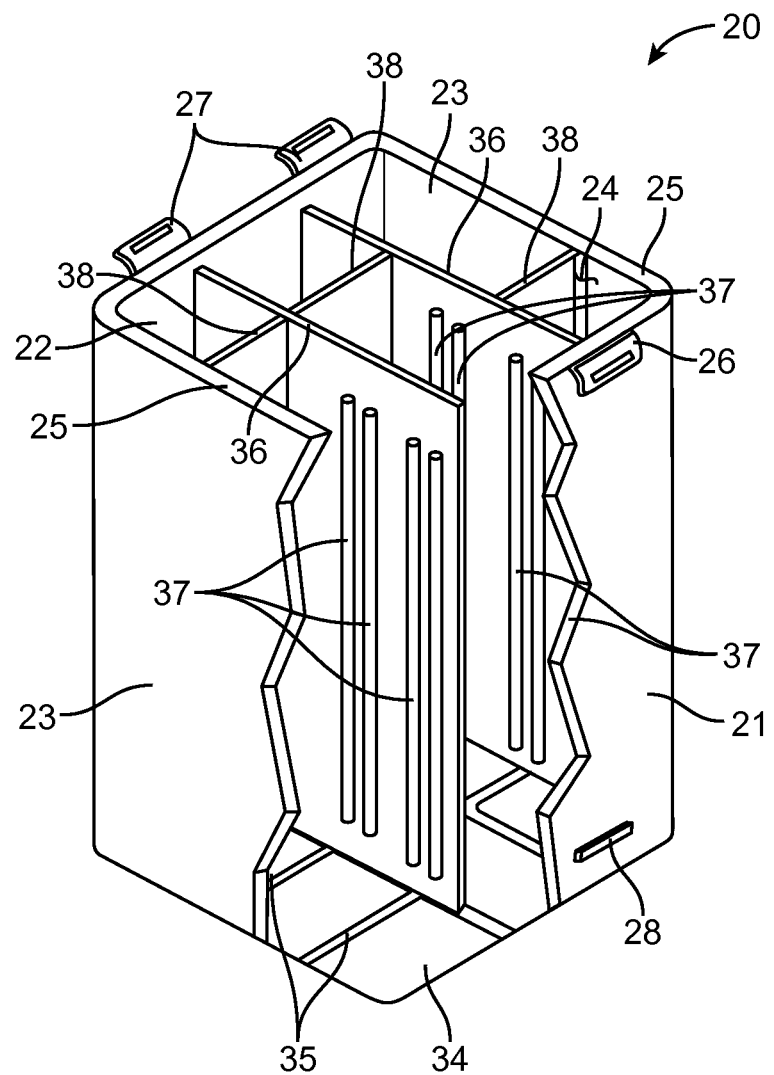
FIG. 5 is a cut-away front perspective view of the middle compartment 20 depicting placement of the middle compartment first divider 36 and the middle compartment second divider 38, according to a preferred embodiment of the present invention.

Referring now to FIGS. 2 through 5, various views of the middle compartment 20, according to the preferred embodiment of the present invention, are disclosed. FIG. 2 depicts a front perspective view of the middle compartment 20, FIG. 3 depicts a rear perspective view of the middle compartment 20, FIG. 4 depicts a cut-away front perspective view of the middle compartment 20 depicting insertion of a middle compartment first divider 36 and a middle compartment second divider 38, and FIG. 5 depicts a cut-away front perspective view of the middle compartment 20 depicting placement of the middle compartment first divider 36 and the middle compartment second divider 38. The middle compartment 20 is utilized to retain a desired amount of dolls 11 within a middle compartment interior portion 24 and is comprised of a middle compartment front panel 21, a middle compartment rear panel 22, a pair of opposing middle compartment side panels 23, and a middle compartment bottom panel 34. The panels 21, 22, 23, 34 are preferably of an injection molding process which fabricates a single durable structure. The middle compartment panels 21, 22, 23, 34 enable a middle compartment upper edge 25 to retain an underside surface of a lower compartment bottom panel 44 (see FIGS. 6 and 7) during storage and transporting purposes.

Figure 7:
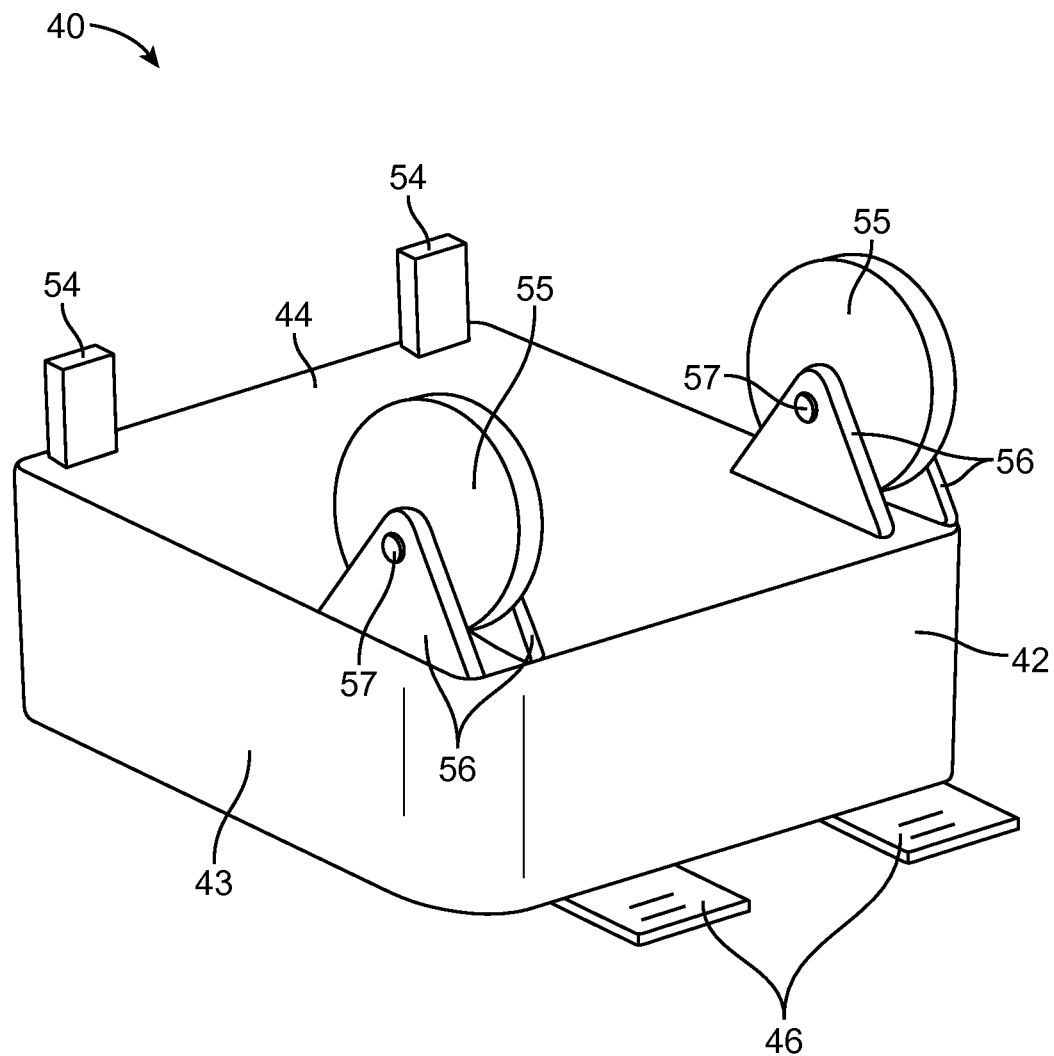
FIG. 7 is a bottom perspective view of the lower compartment 40, according to a preferred embodiment of the present invention.

An upper portion of the middle compartment front panel 21 comprises a pair of middle compartment front latches 26 which are integrally molded to an upper perimeter outer surface of the middle compartment front panel 21 and are utilized to fasten the front upper portion of the middle compartment 20 to a front lower portion of the upper compartment 60 (see FIGS. 8 and 9). A lower portion of the middle compartment front panel 21 comprises a pair of middle compartment front protrusions 28 which are also integrally molded to an outer surface of the middle compartment front panel 21. The pair of middle compartment front protrusions 28 enable a front upper portion of the lower compartment 40 (see FIGS. 6 and 7) to fasten to the middle compartment 20.

An upper portion of the middle compartment rear panel 22 comprises a pair of middle compartment rear latches 27 which are integrally molded to an upper perimeter outer surface of the middle compartment rear panel 22 and are utilized to fasten the rear upper portion of the middle compartment 20 to a rear lower portion of the upper compartment 60. A lower portion of the middle compartment rear panel 22 comprises a pair of middle compartment rear protrusions 29 which are also integrally molded to an outer surface of the middle compartment rear panel 22. The pair of middle compartment rear protrusions 29 enable a rear upper portion of the lower compartment 40 to fasten to the middle compartment 20. The middle compartment rear panel 22 also comprises a pivoting handle 31 which enables a user to carry the apparatus 10 to a desired location or direct the apparatus 10 to a desired location via simultaneously utilizing a pair of wheels 55 upon the lower compartment 40. The handle 31 is comprised of a generally "U"-shaped member which is rotatably attached upon opposing ends to a handle capturing members 32 which enables the handle 31 to pivot upwardly for use or downwardly for storage. In use, opposing exterior vertical members of the handle 31 engage a "C"-shaped clamp 33 which secures the handle 31 via friction fit in a vertical orientation.

The middle compartment interior portion 24 comprises a plurality of middle compartment tracks 30 upon each panel 21, 22, 23. The middle compartment tracks 30 outwardly extend from each panel 21, 22, 23 to retain and guide a middle compartment first divider 36 and to further sectionalize the middle compartment interior portion 24 in a desired matrix. The middle compartment tracks 30 provide a friction fit to each middle compartment first divider 36 which further enables a stabilized installation. The middle compartment first divider 36 is comprised of a rectangularly-shaped preferably plastic section which is slightly smaller than the width of the middle compartment 20. The middle compartment first divider 26 includes a plurality of middle compartment first divider grooves 37. The middle compartment first divider grooves 37 are integrally molded to each surface of the middle compartment first dividers 36 to guide a desired amount of middle compartment second dividers 38. The middle compartment second dividers 38 are comprised of rectangularly-shaped preferably plastic sections which are approximately half the width of the middle compartment first dividers 36. The middle compartment bottom panel 34 comprises a matrix of middle compartment bottom panel grooves 35 for providing a stabilizing installation which correspond to the various patterns the middle compartment dividers 36, 38 can create. The middle compartment bottom panel grooves 35 are molded to an upper surface of the middle compartment bottom panel 34 and are slightly larger than the width of the middle compartment dividers 36, 38 to enable insertion.

Figure 6:
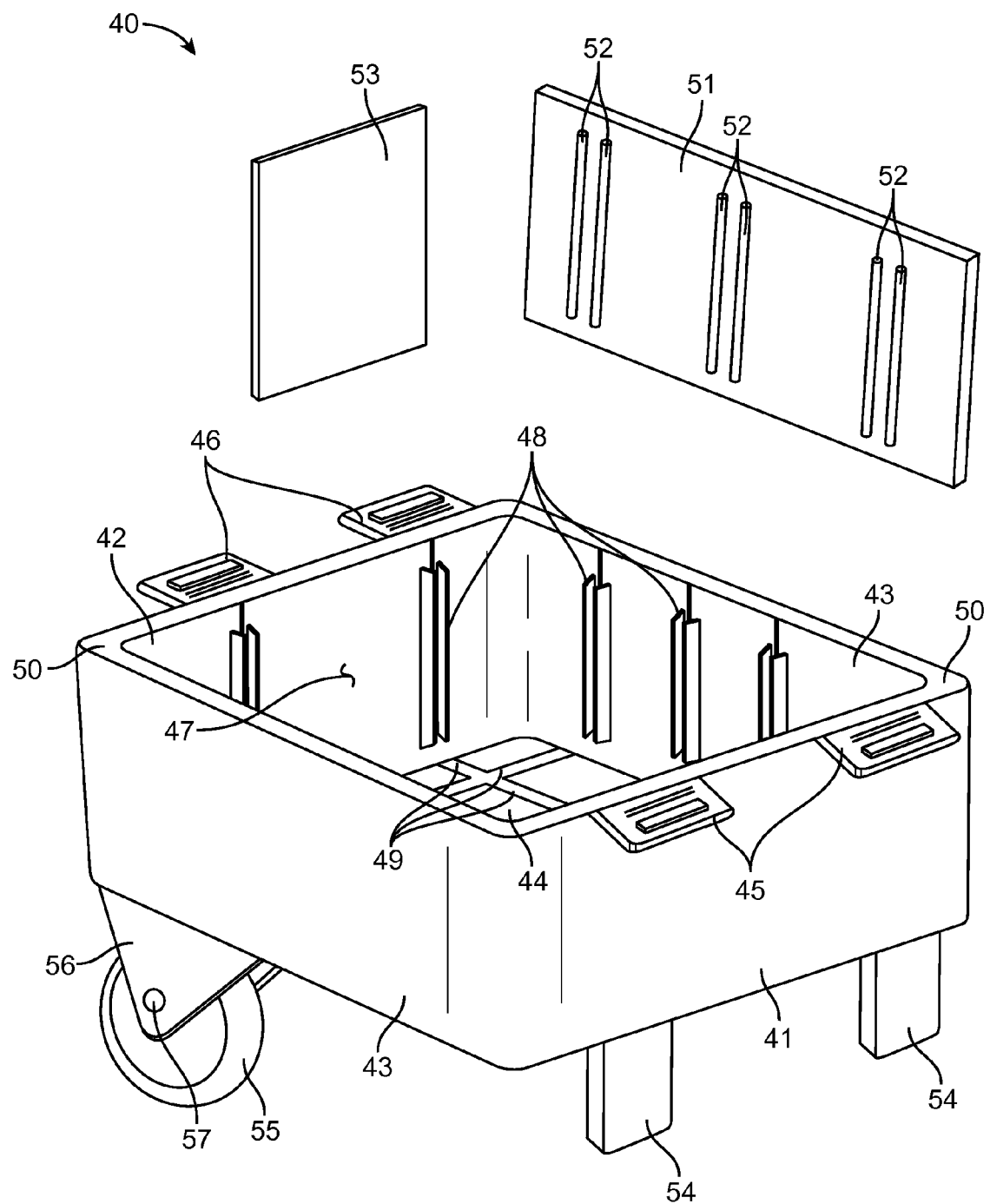
FIG. 6 is a front perspective view of a lower compartment 40 depicting insertion of a lower and upper compartment first divider 51 and a lower and upper compartment second divider 53, according to a preferred embodiment of the present invention.

Referring now to FIG. 6, a front perspective view of the lower compartment 40 depicting insertion of the lower and upper compartment first divider 51 and the lower and upper compartment second divider 53 and FIG. 7, a bottom perspective view of the lower compartment 40, according to the preferred embodiment of the present invention, are disclosed. The lower compartment 40 provides organization and storage to doll accessories 12. The lower compartment 40 also provides the transporting means to the apparatus 10. The lower compartment 40 comprises a rectangular shape which is smaller in height than the middle compartment 20, yet comprises an identical width and depth. The lower compartment 40 is comprised of a lower compartment front panel 41, a lower compartment rear panel 42, a pair of lower compartment side panels 43, and a lower compartment bottom panel 44 which are preferably molded plastic sections similar to the middle compartment 20.

The lower compartment front panel 41 comprises a pair of lower compartment front latches 45 along an outer surface of an upper perimeter edge. The lower compartment front latches 45 are integrally molded to the lower compartment 40 and provide a fastening means to join a front portion of the lower compartment 40 to a bottom front portion of the middle compartment 20. The lower compartment front latches 45 engage the middle compartment front protrusions 28 in a manner which is similar to conventional storage containers on the market. Likewise, the lower compartment rear panel 42 comprises a pair of lower compartment rear latches 46 along an opposing outer surface of the upper perimeter edge. The lower compartment rear latches 46 are also integrally molded to the lower compartment 40 and provide a fastening means to join a rear portion of the lower compartment 40 to a bottom rear portion of the middle compartment 20. The lower compartment rear latches 46 engage the middle compartment rear protrusions 29. In use, the middle compartment bottom panel 34 is positioned upon a lower compartment upper edge 50 aligning the lower compartment latches 45, 46 with the respective middle compartment protrusions 28, 29.

A lower compartment interior portion 47 comprises a plurality of lower compartment tracks 48 which are integrally molded to the surface of the lower compartment panel 41, 42, 43. The lower compartment tracks 48 outwardly extend from each panel 41, 42, 43 to retain and guide a lower and upper compartment first divider 51 and to further sectionalize the lower compartment interior portion 47 in a desired matrix. The lower compartment tracks 48 provide a friction fit to each lower and upper compartment first divider 51 which further enables a stabilized installation. The lower and upper compartment first divider 51 is comprised of a rectangularly-shaped preferably plastic section which is slightly smaller than the width of the lower compartment 40. The lower and upper compartment first divider 51 includes a plurality of lower and upper compartment first divider grooves 52. The lower and upper compartment first divider grooves 52 are integrally molded to each surface of the lower and upper compartment first dividers 51 to guide a desired amount of lower and upper compartment second dividers 53. The lower and upper compartment second dividers 53 are comprised of rectangularly-shaped preferably plastic sections which are approximately half the width of the upper and lower compartment first dividers 51. The lower compartment bottom panel 44 comprises a matrix of lower compartment bottom panel grooves 49 to provide a stabilized installation which correspond to the various patterns the lower compartment dividers 51, 53 can create. The lower compartment bottom panel grooves 49 are molded to an upper surface of the lower compartment bottom panel 44 and are slightly larger than the width of the lower compartment dividers 51, 53 to enable insertion.

An underside surface of the lower compartment bottom panel 44 includes a stabilizing means and a transporting means to the apparatus 10. A front portion of the underside of the lower compartment bottom panel 44 comprises a pair of integral stabilizing fingers 54 which extend downwardly to engage a level floor surface and to further stabilize the apparatus 10 in a vertical position. Opposing each stabilizing finger 54 and located rearwardly is a wheel 55 which enables the apparatus 10 to be directed along the level surface in conjunction with the handle 31. Each wheel 55 is attached to the underside of the lower compartment bottom panel 44 by a pair of triangularly shaped wheel forks 56 which are integrally molded and extend downwardly. Each wheel 55 is attached to each respective wheel fork 56 via a wheel axle 57 which further enables the wheels 55 to rotate in a desired direction.

Referring now to FIG. 8, a front perspective view of the upper compartment 60 and FIG. 9, a rear perspective view of the upper compartment 60, according to the preferred embodiment of the present invention, is disclosed. The upper compartment 60 also provides additional organization and storage to doll accessories 12. The upper compartment 60 comprises a rectangular shape which comprises dimensions similar to the lower compartment 40. The upper compartment 60 is comprised of an upper compartment front panel 61, an upper compartment rear panel 62, a pair of upper compartment side panels 63, and an upper compartment bottom panel 64 which are preferably molded plastic sections similar to the middle compartment 20.

A lower portion of the lower compartment front panel 61 comprises a pair of upper compartment front protrusions 73 outwardly extending from an outer surface thereof, which provide an engaging means from the pair of middle compartment front latches 26. A lower portion of the lower compartment rear panel 62 also comprises a pair of upper compartment rear protrusions 74 outwardly extending from an outer surface thereof, which provide an engaging means to the pair of middle compartment rear latches 27. The upper compartment protrusions 73, 74 enable the upper compartment 60 to be fastened to the middle compartment 20.

An upper compartment interior portion 70 comprises a plurality of upper compartment tracks 71 which are integrally molded to the surface of the upper compartment panels 61, 62, 63. The upper compartment tracks 71 outwardly extend from each panel 61, 62, 63 to retain and guide a lower and upper compartment first divider 51 and to further sectionalize the upper compartment interior portion 70 in a desired matrix. The same upper and lower dividers 51, 53 utilized with the lower compartment 40 are utilized for the upper compartment 60 because of the identical dimensions (see FIGS. 6 and 7). The upper compartment bottom panel 64 comprises a matrix of upper compartment bottom panel grooves 72 which correspond to the various patterns the lower and upper compartment dividers 51, 53 can create. The upper compartment bottom panel grooves 72 are molded to an upper surface of the upper compartment bottom panel 64 and are slightly larger than the width of the lower and upper compartment dividers 51, 53 to enable insertion.

The upper compartment 60 also comprises a lid 66 which encloses the upper compartment interior portion 70. The lid 66 is attached to a rear perimeter edge of an upper compartment upper edge 65 via a pair of lid hinges 67. The lid hinges 67 are preferably fabricated from a material similar to the upper compartment 60 and plastic welded to the rear perimeter edge of the upper compartment upper edge 65 and to a rear perimeter edge of the lid 66. A front edge of the lid 66 comprises an integral lid latch 68 which engages a lid protrusion 69 which is located upon an upper surface of the upper compartment front panel 61.

Referring now to FIG. 10, a rear perspective view of the apparatus 10 depicting the alternate handle assembly 80, according to the preferred embodiment of the present invention, is disclosed. The apparatus 10 may alternately comprise an alternate handle assembly 80 which provides a sliding luggage-type handle in lieu of the above-mentioned handle 31. The alternate handle assembly 80 comprises an alternate handle casing 81 which is molded to a surface of the middle compartment rear panel 22. The alternate handle casing 81 encloses an alternate handle track 84 which enables a sliding member 83 to travel upon. The sliding member 83 is pulled upwardly in an exposed manner for use and pushed downwardly within the alternate handle casing 81 for storage. An upper portion of the sliding member 83 comprises an alternate handle grasping member 82 which provides a horizontal surface of the user to gasp.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; pivoting the handle 31 to an upward orientation and fastening the each clamp 33; directing the apparatus 10 to a desired location via pushing or pulling the handle 31 in a desired direction and enabling the apparatus 10 to travel about the wheels 55 upon a desired level surface; resting the apparatus 10 at a desired location, supported by the wheels 55 and fingers 54; unlatching the middle compartment front and rear latches 26, 26 and removing the upper compartment 60 from the middle compartment 20; unlatching the lower compartment front and rear latches 45, 46 from the middle compartment 20 and removing the middle compartment 20 from the lower compartment 40; unlatching the lid latch 68 from the lid protrusion 69 and lifting the lid 66 about the lid hinges 67 to expose the upper compartment interior portion 70; inserting a desired amount of lower and upper compartment dividers 51, 53 into the upper compartment interior portion 70 within the upper compartment track 71 and lower and upper compartment first divider groove 52 as desired; inserting a desired amount of doll accessories 12 into the upper compartment interior portion 70 as desired; latching the lid latch 68 back upon the lid protrusion 69; inserting a desired amount of middle compartment dividers 36, 38 into the middle compartment interior portion 24 within the middle compartment track 30 and middle compartment first divider groove 37 as desired; inserting a desired amount of dolls 11 into the middle compartment interior portion 24 as desired; inserting a desired amount of lower and upper compartment dividers 51, 53 into the lower compartment interior portion 47 within the lower compartment track 48 and lower and upper compartment first divider groove 52 as desired; inserting a desired amount of doll accessories 12 into the lower compartment interior portion 47 as desired; positioning the underside of the middle compartment bottom panel 34 onto the lower compartment upper edge 50 and latching the lower compartment front and rear latches 45, 46 onto the respective middle compartment front and rear protrusions 28, 29; positioning the under of the upper compartment bottom panel 64 upon the middle compartment upper edge 25 and latching the middle compartment front and rear latches 26, 27 upon the upper compartments front and rear protrusions 73, 74; angling the apparatus 10 via the handle 31 and transporting via the wheels 55 as desired; resting in an upright position via the stabilizing fingers 54 as desired; and, providing a means to keep dolls 11 clean and organized.

The method of installing and utilizing the apparatus 10 with the alternate handle assembly 80 may be achieved by performing the following steps: sliding the sliding member 83 upwardly from the alternate handle casing 81 and grasping the alternate handle grasping member 82; directing the apparatus 10 to a desired location via pushing or pulling the alternate handle grasping member 82 in a desired direction and enabling the apparatus 10 to travel about the wheels 55 upon a desired level surface; resting the apparatus 10 at a desired location, supported by the wheels 55 and fingers 54; unlatching the middle compartment front and rear latches 26, 26 and removing the upper compartment 60 from the middle compartment 20; unlatching the lower compartment front and rear latches 45, 46 from the middle compartment 20 and removing the middle compartment 20 from the lower compartment 40; unlatching the lid latch 68 from the lid protrusion 69 and lifting the lid 66 about the lid hinges 67 to expose the upper compartment interior portion 70; inserting a desired amount of lower and upper compartment dividers 51, 53 into the upper compartment interior portion 70 within the upper compartment track 71 and lower and upper compartment first divider groove 52 as desired; inserting a desired amount of doll accessories 12 into the upper compartment interior portion 70 as desired; latching the lid latch 68 back upon the lid protrusion 69; inserting a desired amount of middle compartment dividers 36, 38 into the middle compartment interior portion 24 within the middle compartment track 30 and middle compartment first divider groove 37 as desired; inserting a desired amount of dolls 11 into the middle compartment interior portion 24 as desired; inserting a desired amount of lower and upper compartment dividers 51, 53 into the lower compartment interior portion 47 within the lower compartment track 48 and lower and upper compartment first divider groove 52 as desired; inserting a desired amount of doll accessories 12 into the lower compartment interior portion 47 as desired; positioning the underside of the middle compartment bottom panel 34 onto the lower compartment upper edge 50 and latching the lower compartment front and rear latches 45, 46 onto the respective middle compartment front and rear protrusions 28, 29; positioning the under of the upper compartment bottom panel 64 upon the middle compartment upper edge 25 and latching the middle compartment front and rear latches 26, 27 upon the upper compartments front and rear protrusions 73, 74; angling the apparatus 10 via the alternate handle grasping member 82 and transporting via the wheels 55 as desired; resting in an upright position via the stabilizing fingers 54 as desired; and, providing a means to keep dolls 11 clean and organized.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A multi-sectional container, comprising:
a lower compartment, further comprising a pair of side walls, a bottom wall, a front wall, and a rear wall defining a hollow interior;
a first dividing means for dividing said lower compartment into multiple compartments;
a middle compartment, further comprising a pair of side walls, a bottom wall, a front wall, and a rear wall defining a hollow interior;
a second dividing means for dividing said middle compartment into multiple compartments;
a first attachment means for removably attaching said lower compartment to said middle compartment;
an upper compartment, further comprising a pair of side walls, a bottom wall, a front wall, and a rear wall defining a hollow interior;
a second attachment means for removably attaching said middle compartment to said upper compartment;
a third dividing means for dividing said upper compartment into multiple compartments;
a lid hingedly attached to an upper perimeter edge of said upper compartment, having a latching mechanism for removably securing said lid to said upper compartment;
a pivoting handle assembly affixed to said rear wall of said middle compartment; and,
a pair of clamps located on an outer surface of said middle compartment rear wall located above said pivoting handle assembly.

2. The container of claim 1, wherein said container comprises an overall generally rectangular shape; and,
wherein said middle compartment comprises a larger volume than said lower compartment and said upper compartment.

3. The container of claim 2, further comprising a stabilizing means and a transporting means for said container.

4. The container of claim 3, wherein:
said stabilizing means further comprises pair of stabilizing appendages depending downward from an outer surface of said lower compartment bottom wall adjacent a front edge thereof; and,
said transporting means further comprising a pair of wheel assemblies each comprising a wheel supported by a wheel fork mounted to said outer surface of said bottom wall adjacent to a front edge thereof and opposite said pair of appendages.

5. The container of claim 2, wherein said first dividing means further comprises:
a plurality of lower compartment tracks inwardly extending from an inner surface of said lower compartment pair of sides walls, said lower compartment rear wall, and said lower compartment front wall;
a plurality of lower compartment bottom panel grooves each integrally molded within an upper surface of said lower compartment bottom panel and spanning a width thereof;
a plurality of lower compartment first divider panels, each comprising a planar, generally rectangular panel and a plurality of lower compartment first divider panel tracks inwardly extending from opposing longitudinal surfaces thereof; and,
a plurality of lower compartment second divider panels, each comprising a planar, generally rectangular panel;
wherein said tracks on said lower compartment pair of side walls and said lower compartment bottom panel grooves are aligned to receive an individual lower compartment first divider panel;
wherein said tracks on said lower compartment front wall, said lower compartment rear wall, and said lower compartment bottom panel grooves are aligned to receive an individual lower compartment first divider panel;

wherein said tracks on said lower compartment pair of side walls and said lower compartment first divider panels are aligned to receive an individual lower compartment second divider panel;

wherein said tracks on said lower compartment front wall and said lower compartment first divider panels and said lower compartment bottom panel grooves are aligned to receive an individual lower compartment second divider panel; and, wherein said tracks on said lower compartment rear wall and said lower compartment first divider panels and said lower compartment bottom panel grooves are aligned to receive an individual lower compartment second divider panel.

6. The container of claim 2, wherein said second dividing means further comprises:

a plurality of middle compartment tracks inwardly extending from an inner surface of said middle compartment pair of sides walls, said middle compartment rear wall, and said middle compartment front wall;

a plurality of middle compartment bottom panel grooves each integrally molded within an upper surface of said middle compartment bottom panel and spanning a width thereof;

a plurality of middle compartment first divider panels, each comprising a planar, generally rectangular panel and a plurality of middle compartment first divider panel tracks inwardly extending from opposing longitudinal surfaces thereof; and, a plurality of middle compartment second divider panels, each comprising a planar, generally rectangular panel;

wherein said tracks on said middle compartment pair of side walls and said middle compartment bottom panel grooves are aligned to receive an individual middle compartment first divider panel; and, wherein said tracks on said middle compartment front wall, said middle compartment rear wall, and said middle compartment bottom panel grooves are aligned to receive an individual middle compartment first divider panel;

wherein said tracks on said middle compartment pair of side walls and said middle compartment first divider panels are aligned to receive an individual middle compartment second divider panel;

wherein said tracks on said middle compartment front wall and said middle compartment first divider panels and said middle compartment bottom panel grooves are aligned to receive an individual middle compartment second divider panel; and, wherein said tracks on said middle compartment rear wall and said middle compartment first divider panels and said middle compartment bottom panel grooves are aligned to receive an individual middle compartment second divider panel.

7. The container of claim 2, wherein said third dividing means further comprises:

a plurality of upper compartment tracks inwardly extending from an inner surface of said upper compartment pair of sides walls, said upper compartment rear wall, and said upper compartment front wall;

a plurality of upper compartment bottom panel grooves, each integrally molded within an upper surface of said upper compartment bottom panel and spanning a width thereof;

a plurality of upper compartment first divider panels, each comprising a planar, generally rectangular panel and a plurality of upper compartment first divider panel tracks inwardly extending from opposing longitudinal surfaces thereof; and, a plurality of upper compartment second divider panels, each comprising a planar, generally rectangular panel;

wherein said tracks on said upper compartment pair of side walls and said upper compartment bottom panel grooves are aligned to receive an individual upper compartment first divider panel; and, wherein said tracks on said upper compartment front wall, said upper compartment rear wall, and said upper compartment bottom panel grooves are aligned to receive an individual upper compartment first divider panel;

wherein said tracks on said upper compartment pair of side walls and said upper compartment first divider panels are aligned to receive an individual upper compartment second divider panel;

wherein said tracks on said upper compartment front wall and said upper compartment first divider panels and said upper compartment bottom panel grooves are aligned to receive an individual upper compartment second divider panel; and, wherein said tracks on said upper compartment rear wall and said upper compartment first divider panels and said upper compartment bottom panel grooves are aligned to receive an individual upper compartment second divider panel.

8. The container of claim 2, wherein said first attachment means further comprises:

a pair of first front latches integrally molded to an upper perimeter outer surface of said lower compartment front wall;

a pair of first front protrusions integrally molded within an outer surface of said middle compartment front wall;

a pair of first rear latches integrally molded to an upper perimeter outer surface of said lower compartment rear wall; and, a pair of first rear protrusions integrally molded within an outer surface of said middle compartment rear wall;

wherein said pair of first front latches are correspondingly received and horizontally aligned with said pair of first front protrusions; and, wherein said pair of first rear latches are correspondingly received and horizontally aligned with said pair of first rear protrusions.

9. The container of claim 2, wherein said second attachment means further comprises:

a pair of second front latches integrally molded to an upper perimeter outer surface of said middle compartment front wall;

a pair of second front protrusions integrally molded within an outer surface of said upper compartment front wall;

a pair of second rear latches integrally molded to an upper perimeter outer surface of said middle compartment rear wall; and, a pair of second rear protrusions integrally molded within an outer surface of said upper compartment rear wall;

wherein said pair of second front latches are correspondingly received and horizontally aligned with said pair of second front protrusions; and, wherein said pair of second rear latches are correspondingly received and horizontally aligned with said pair of second rear protrusions.

10. The container of claim 2, wherein said pivoting handle assembly further comprises:

a pair of capturing members located on an intermediate position of an outer surface of said middle compartment rear wall; and a handle member having a first end rotatably attached to said pair of capturing members, a pair of parallel arms having a first end extending outward from said first end, and a second end affixed to a second end of said pair of arms having a handle grip wherein said pair of clamps each correspondingly receive one of said pair of arms to secure said handle member to said middle compartment rear wall.

* * * * *